(12) United States Patent
Wheeler et al.

(10) Patent No.: US 8,672,120 B2
(45) Date of Patent: Mar. 18, 2014

(54) WIREWAY FOR CONVEYOR

(75) Inventors: Gregory L. Wheeler, Arlington, TX (US); Marty Buchanan, Grand Prairie, TX (US); Robert Carter, Weatherford, TX (US); Jeremy P. Shepard, Cleburne, TX (US)

(73) Assignee: Glidepath, Grand Prairie, TX (US)

( * ) Notice: Subject to any disclaimer, the term of this patent is extended or adjusted under 35 U.S.C. 154(b) by 439 days.

(21) Appl. No.: 12/932,299

(22) Filed: Feb. 23, 2011
(Under 37 CFR 1.47)

(65) Prior Publication Data
US 2011/0303434 A1    Dec. 15, 2011

Related U.S. Application Data

(60) Provisional application No. 61/338,751, filed on Feb. 23, 2010.

(51) Int. Cl.
*B65G 21/08* (2006.01)
*B65G 21/06* (2006.01)

(52) U.S. Cl.
USPC .................................. 198/860.1; 198/861.1

(58) Field of Classification Search
None
See application file for complete search history.

(56) References Cited

U.S. PATENT DOCUMENTS 5,562,202 A * 10/1996 Newcomb et al. ......... 198/861.1

* cited by examiner

*Primary Examiner* — Kavel Singh
(74) *Attorney, Agent, or Firm* — Warn Partners, P.C.

(57) ABSTRACT

The present invention is a wireway for a conveyor system which is integrally molded into the sideguard of the conveyor system. The sidewall, or sideguard, has both an inner wall and an outer wall, and there is an intermediate wall connected to both the inner wall and outer wall. The inner wall, outer wall, and intermediate wall form an upper passage and a lower passage which function as a wireway in which wires are fed through and connect to various components of the conveyor system.

6 Claims, 5 Drawing Sheets

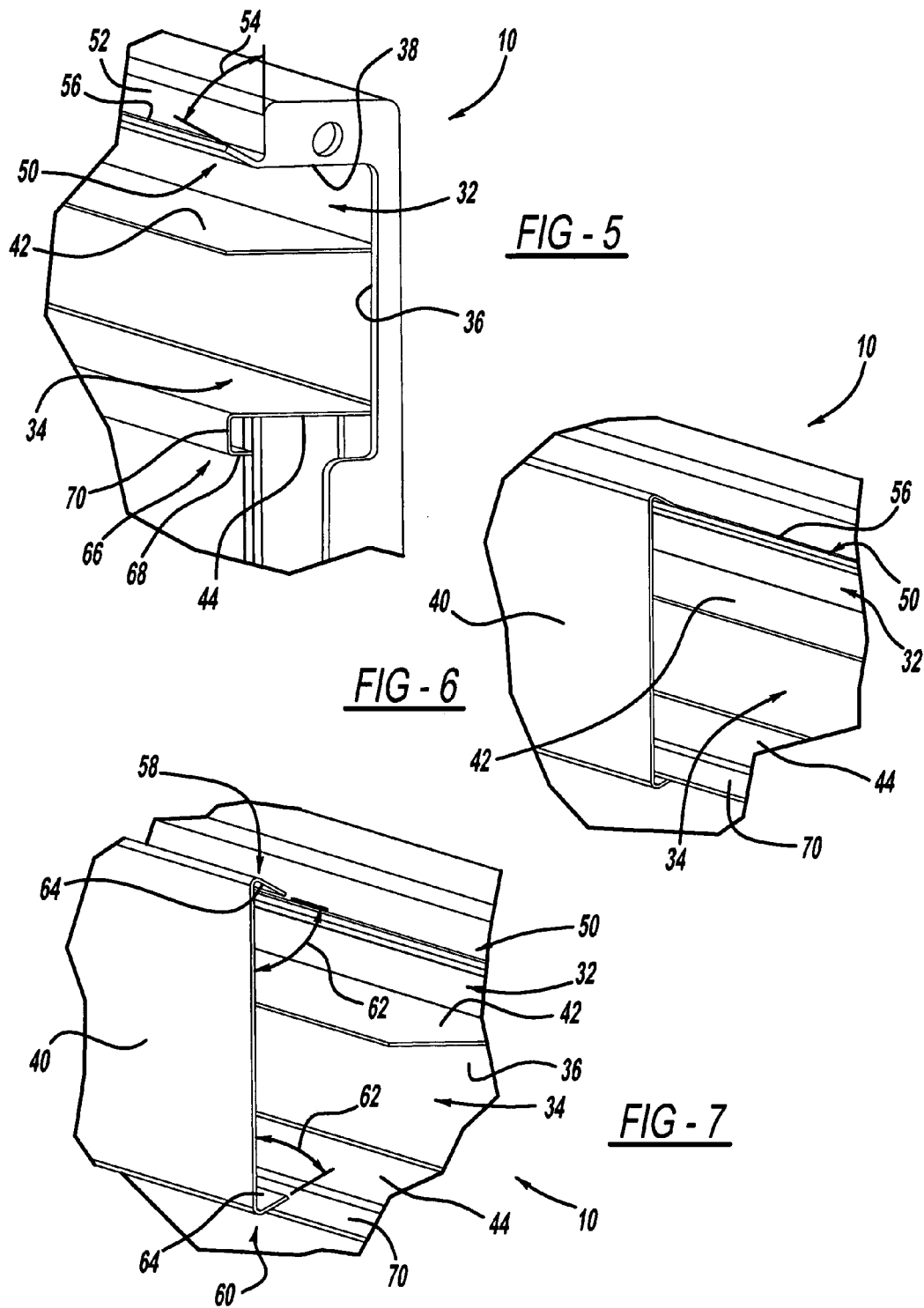

US 8,672,120 B2

WIREWAY FOR CONVEYOR

CROSS-REFERENCE TO RELATED APPLICATIONS

This application claims priority to U.S. Provisional Application No. 61/338,751 filed on Feb. 23, 2010. The disclosure of the above application is incorporated herein by reference.

FIELD OF THE INVENTION

The present invention relates to a wireway integrated into the side guards of a conveyor.

BACKGROUND OF THE INVENTION

Conveyors are a commonly used device for transporting various items from one location to the next. Conveyors typically have a belt which is mounted on a series of rollers or the like driven by an electric motor. Items placed on the belt are relocated as the belt moves.

Conveyors also typically have a side guard which serves the purpose of preventing items from falling off of the conveyor, and for preventing items from becoming stuck underneath the conveyor belt.

There are various electrically operated components which are used for controlling the operation the conveyor belt system. It some applications, such as with the use of a conveyor system at an airport, the conveyor belt must be of a great length, and the electrical components are spread out along the conveyor system over a large area. These electrical components typically have a wire connection between each other, and the wires must also be of a great length to electrically connect the various components. Previous conveyor belt designs have not always taken into consideration the routing of electrical wires between various components.

Accordingly there exists a need for a conveyor system that facilitates the routing of electrical wire between various components.

SUMMARY OF THE INVENTION

The present invention is a wireway for a conveyor system which is integrally molded into the sideguard of the conveyor system. The sidewall, or sideguard, has both an inner wall and an outer wall, and there is an intermediate wall connected to both the inner wall and outer wall. The inner wall, outer wall, and intermediate wall form an upper passage and a lower passage which function as a wireway in which wires are fed through and connect to various components of the conveyor system. In an alternate embodiment, the intermediate wall is eliminated to provide one large passage.

The integrated wireway of the present invention also includes an upper wall which forms part of the upper passage, and a lower wall which forms part of the lower passage. There is a lip portion formed as part of the upper wall and outer wall which is used for supporting various components that are part of the conveyor system.

The wireway of the present invention provides the advantage of providing a location for the placement of electrical wires that are used to electrically connect various components used to operate a conveyor system. Many different devices are able to be mounted on the lip portion and connect to the wires extending through the upper and lower passages. Additionally, because there is more than one passage, high voltage and low voltage wires are able to be separated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a sectional side view of a portion of a conveyor belt incorporating a wireway, according to the present invention;

FIG. 6 is a first enlarged perspective view of a portion of a conveyor belt incorporating a wireway, according to the present invention;

FIG. 7 is a second enlarged perspective view of a portion of a conveyor belt incorporating a wireway, according to the present invention;

DETAILED DESCRIPTION OF THE PREFERRED EMBODIMENTS

Figure 1:
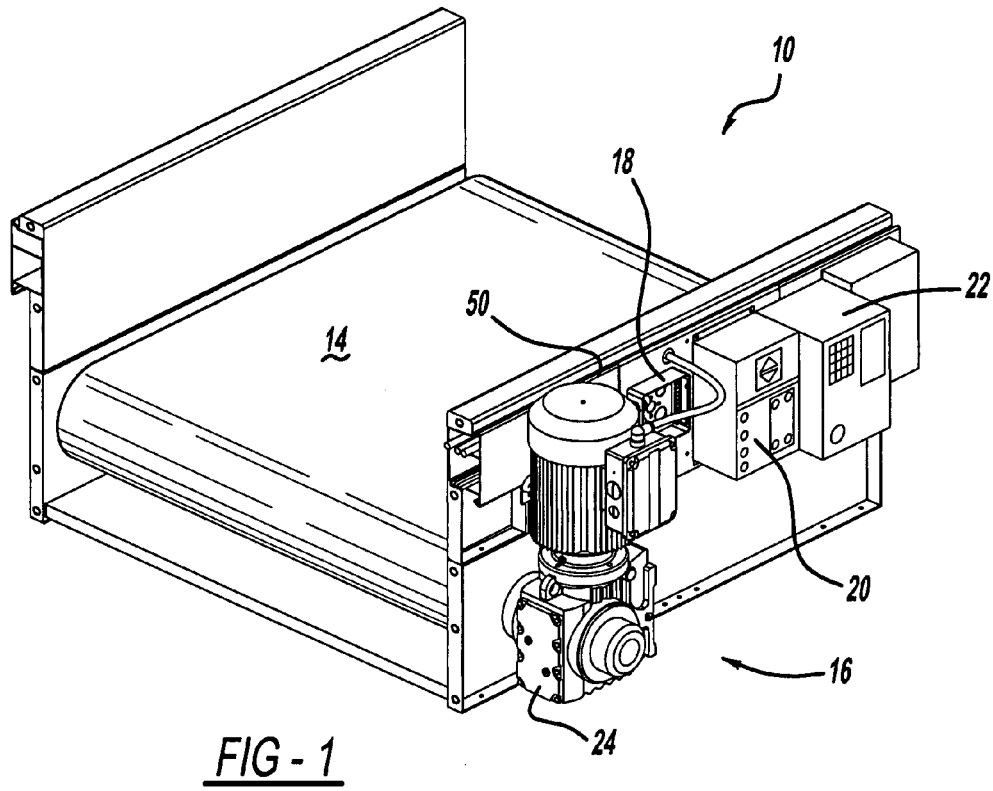
FIG. 1 is a perspective view of a portion of a conveyor belt incorporating a wireway, according to the present invention.
Figure 2:
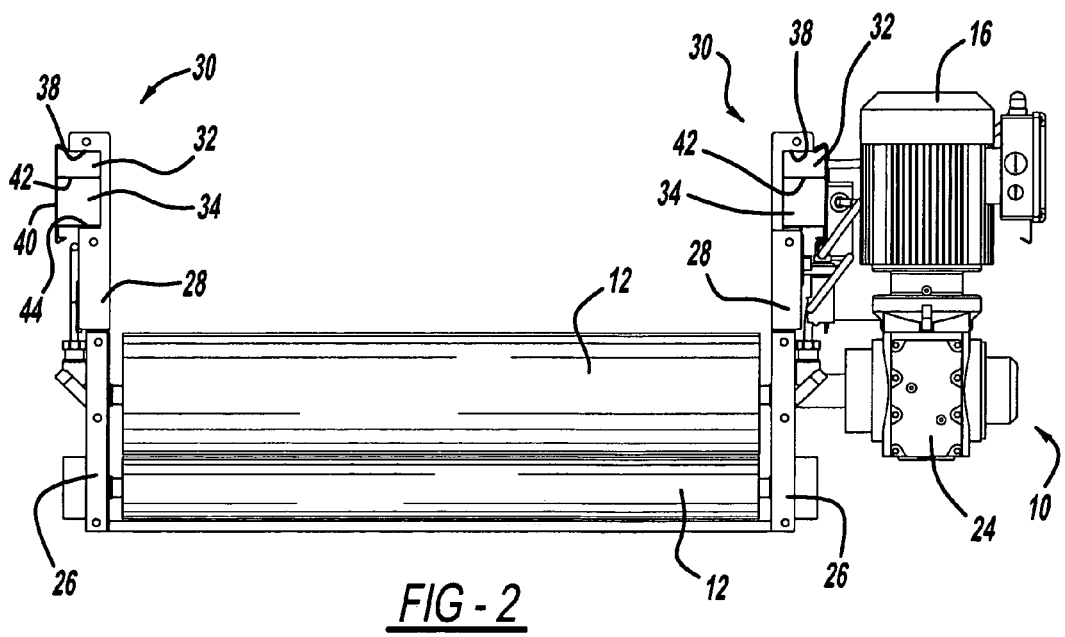
FIG. 2 is a front view of a portion of a conveyor belt incorporating a wireway, according to the present invention.
Figure 3:
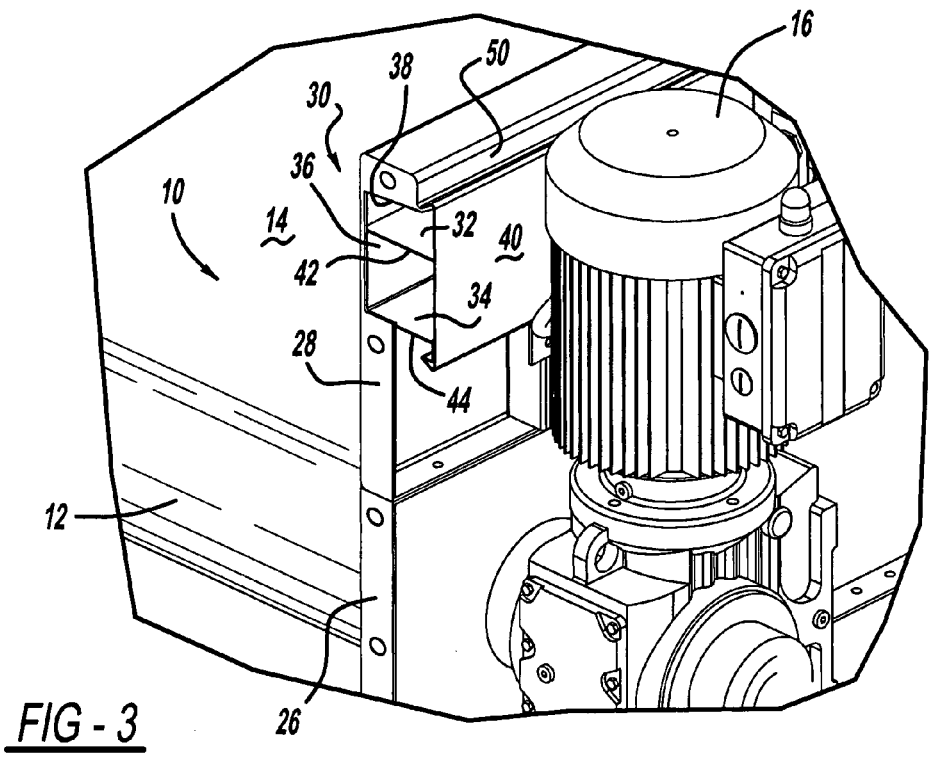
FIG. 3 is an enlarged view of a portion of the conveyor belt incorporating a wireway shown in FIG. 1, according to the present invention.
Figure 4:
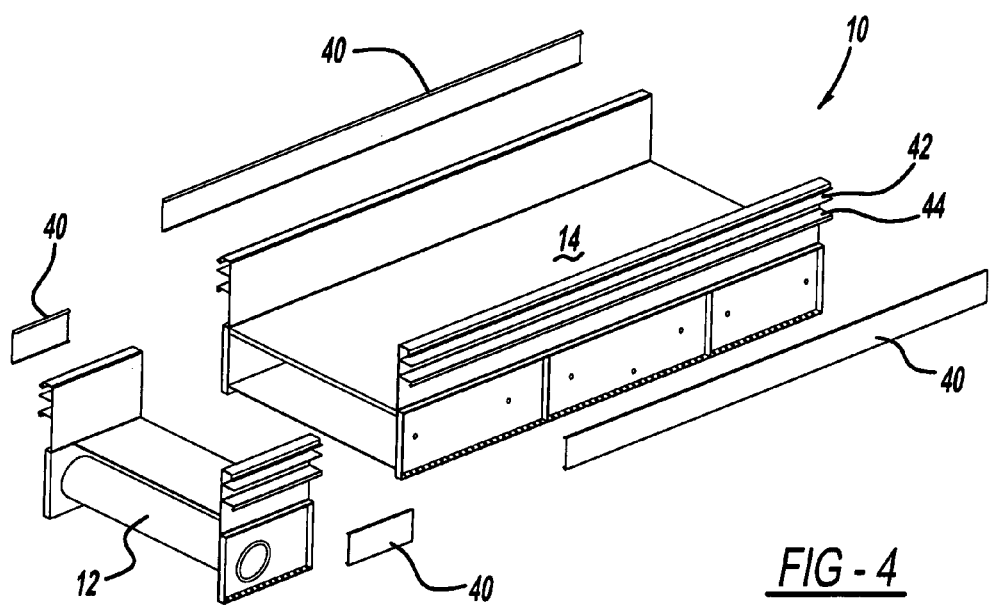
FIG. 4 is an exploded view of a portion of a conveyor belt incorporating a wireway, according to the present invention.
Figure 8:
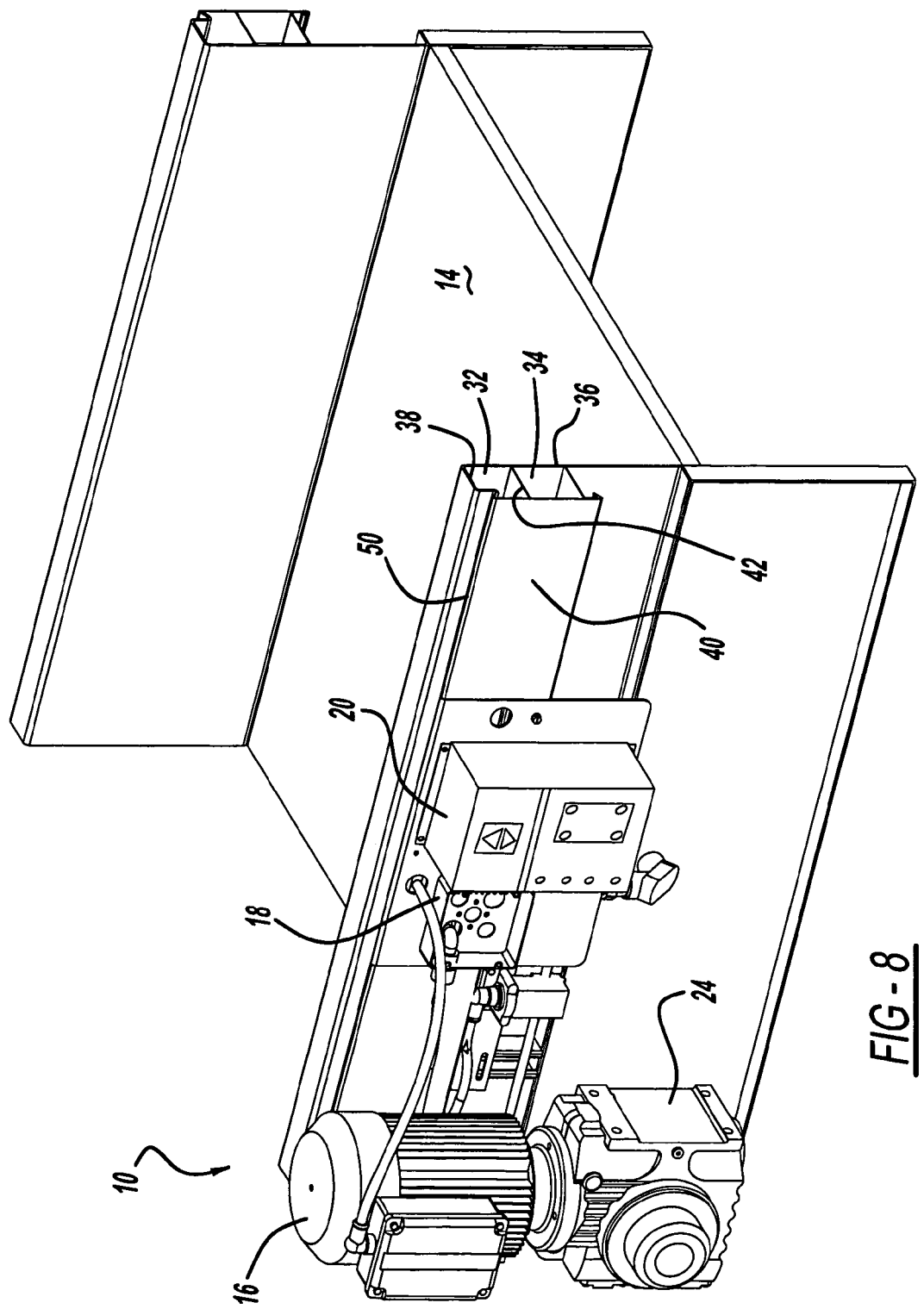
FIG. 8 is a perspective view of a portion of a conveyor belt with the rollers removed and incorporating a wireway, according to the present invention.
Figure 9:
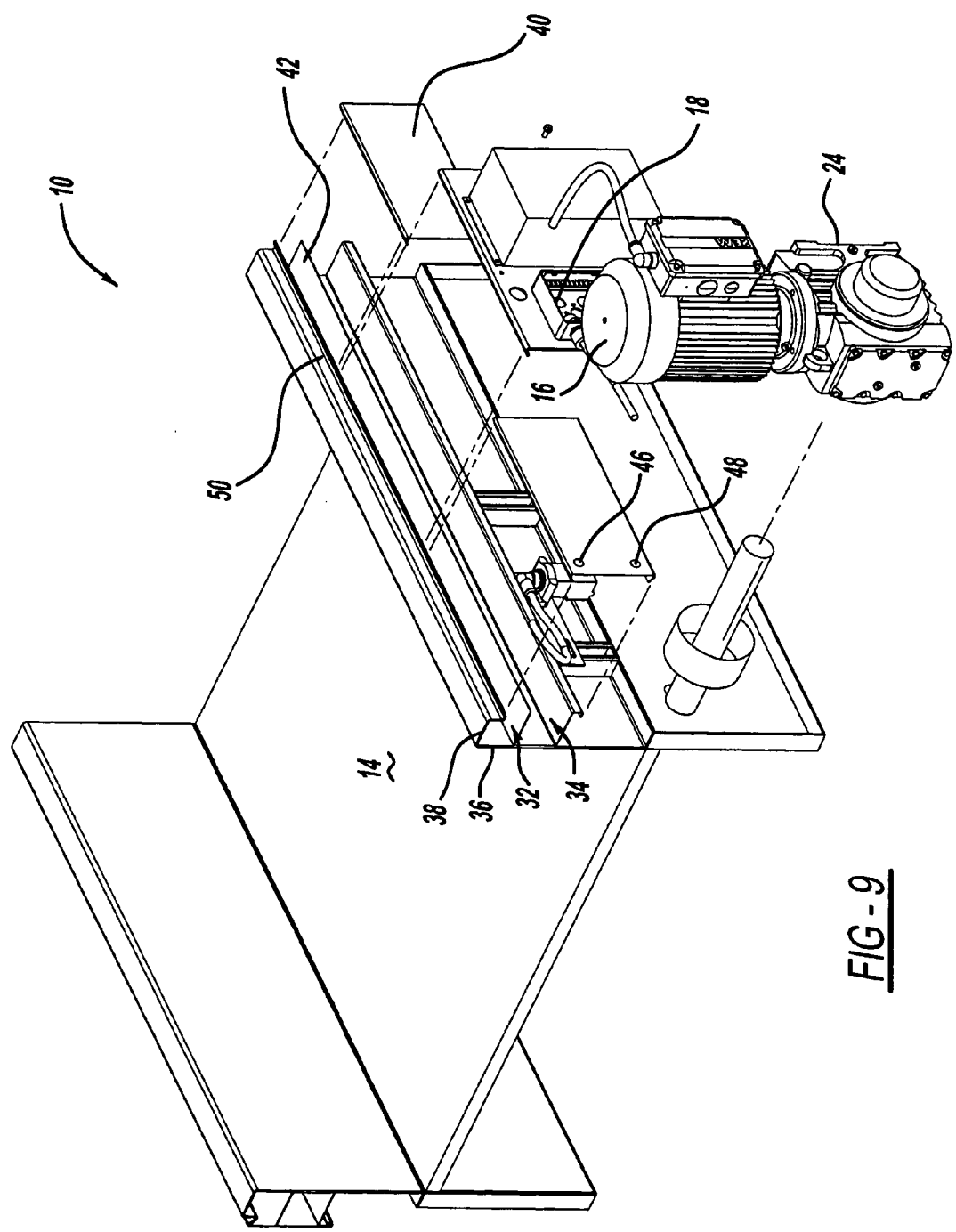
FIG. 9 is an exploded view of a portion of a conveyor belt with the rollers removed and incorporating a wireway, according to the present invention.

The following description of the preferred embodiment(s) is merely exemplary in nature and is in no way intended to limit the invention, its application, or uses.

A material handling device such as a conveyor system incorporating a wireway according to the present invention is shown in the Figures generally at 10. The system 10 includes a plurality of rollers 12 and a conveyor belt 14. The conveyor belt 14 is driven by the rollers 12 for transporting items positioned on the belt 14. The rollers 12 are driven by one or more electric motors 16. There are other components such as a controller 18, a circuit box 20, and a monitoring system 22. There is also a gearbox 24 which is used for transferring power from the motor 16 to the rollers 12.

Disposed on each side of the conveyor system 10 is lower side wall 26; the rollers 12 are mounted to the lower sidewall 26. Mounted on top of each of the lower side walls 26 is an upper side wall 28. Formed as part of each of the upper side walls 28 is a wireway, generally shown at 30. The wireway 30 includes an upper passage 32 and a lower passage 34. The passages 32,34 are best suited for a wire, or in some applications a group of wires to be fed through and connected to the various electrical components which are part of the conveyor system 10. In alternate embodiments, the passages 32,34 function as a wiring chase or a wiring raceway.

The upper side wall 28 includes an inner wall 36 which is part of both of the passages 32,34, and an upper wall 38 which is part of the upper passage 32. There is also an outer wall 40 which is detachable and is also part of both of the passages 32,34 as shown in the Figures. Dividing the passages 32,34 is an intermediate wall 42 which is formed as part of the inner wall 36 and extends towards and abuts the outer wall 40. Also formed as part of the inner wall 36 and extending towards the outer wall 40 is a lower wall 44 which forms part of the lower passage 34. The walls 36,38,42,44 are all integrally formed as part of the upper side wall 28, and extend along the entire length of the upper side wall 28, and the outer wall 40 connects to the upper wall 38 and lower wall 44 in a manner to be described later.

As mentioned above, wire is fed through the passages 32,34 for the purpose of electrically connecting the various components which are part of the conveyor system 10. There is also a first set of apertures 46 which are formed as part of the outer wall 40 in the areas of both the upper passage 32, and there is also a second set of apertures 48 formed as part of the outer wall 40 in the area of the lower passage 34. The first set of apertures 46 are used for allowing wire to extend out of the upper passage 32 and connect to various electrical components. Similarly, wire also extends out of the lower passage 34 through the second set of apertures 48 to also connect with various electrical components. Another advantage of the invention is that because there are two passages 32,34, high voltage wire is located in one of the passages 32,34, and low voltage wire is located in the other passage 32,34. For example, high voltage wire may be located in the upper passage 32, and low voltage wire may be located in the lower passage 34, and vice versa.

Also formed as part of the upper wall 38 is a lip portion, generally shown at 50, extending away from an upper outer surface 52 at an angle 54. The lip portion 50 has a receiving surface 56, which is used to provide a support for various devices which are part of the conveyor system 10. For example, devices such a starter, disconnect switches, or the components such as the electric motor 16, the controller 18, circuit box 20, or the monitoring system 22 mentioned above, may be hung from the lip portion 50 on the receiving surface 56.

As mentioned above, the outer wall 40 is connected to the upper wall 38 and lower wall 44. In addition to providing support for various devices that are part of the conveyor system 10, the lip portion 50 also provides a connection between the outer wall 40 and the upper wall 38. In this embodiment, the outer wall 40 is divided into sections, and also includes an upper flange, generally shown at 58, and a lower flange, generally shown at 60. The upper flange 58 and lower flange 60 extend away from the outer wall 40 at an angle 62. Each of the flanges 58,60 also include an inner contact surface 64.

The lower wall 44 includes a lower curved portion, generally shown at 66, which has a lower lip 68 connected to a lower outer surface 70. During assembly, the outer wall 40 is positioned relative to the lip portion 50 such that the inner contact surface 64 of the upper flange 58 is in contact with the receiving surface 56 of the lip portion 50. The outer wall 40 is then positioned such that the inner contact surface 64 of the lower flange 60 slides around the lower outer surface 70 and lower lip 68 of the curved portion 66. This causes a minor displacement of the outer wall 40 in a downward direction, thereby causing the upper flange 58 to apply pressure to the lip portion 50, resulting in a deflection of the lip portion 50. The lower curved portion 66 thereby applies a force to the lower flange 60. The force applied by the lip portion 50 to the upper flange 58 and the force applied by the lower curved portion 66 to the lower flange 60 maintains the connection of the outer wall 40 to the upper wall 38 and lower wall 44. The connection between the lower flange 60 and the lower curved portion 66 is essentially a snap-fit connection.

Alternatively, when the outer wall 40 is connected to the upper wall 38 and lower wall 44, components are supported by the upper flange 58, instead of the receiving surface 56, because the upper flange 58 is located on the receiving surface 56.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated wireway for a conveyor system having a lower side wall with roller mounted to the lower side wall, said integrated wireway comprising:
    an upper side wall for mounting on top of a lower side wall, said upper side wall being part of the conveyor system;
    a upper passage formed as part of said upper side wall;
    a lower passage formed as part of said upper side wall;
    an inner wall integrally formed with said upper side wall such that said inner wall forms a part of said upper passage and said lower passage;
    an upper wall integrally formed with said inner wall such that said upper wall forms a part of said upper passage, and said upper wall having an upper outer surface and a lip portion extending away from the upper wall outer surface at an angle, said lip portion having a lip receiving surface providing a support for various devices which are part of the conveyor system;
    a lower wall integrally formed with said inner wall such that said lower wall forms a part of said lower passage, said lower wall having a lower curved portion with a lower lip, said lower curved portion having a lower outer surface;
    an outer wall connected to said upper wall and said lower wall such that said outer wall forms a part of said upper passage and said lower passage, said outer wall having a formed upper flange extending away at an angle and said outer wall having a formed lower flange extending away at an angle, and said upper wall lip portion providing a connection between said outer wall and said upper wall;
    an intermediate wall formed as part of said inner wall such that said intermediate wall extends towards and contacts said outer wall, and separates said upper passage and said lower passage;
    wherein said upper flange of said outer wall is in contact with said lip portion of said upper wall when said outer wall is connected to said upper wall and said lower flange of said outer wall is in contact with said lower lip of said curved portion when said outer wall is connected to said lower wall in a snap-fit connection; and
    wherein a plurality of wires are operable for extending through either or both of said upper passage or said lower passage.

2. The integrated wireway for a conveyor system of claim 1, wherein various devices of said conveyor system are supported by said upper wall lip portion, said various devices being one selected from the group consisting of an electric motor, a controller, a circuit box, and a monitoring system.

3. The integrated wireway for a conveyor system of claim 1, further comprising:
    a first set of apertures formed as part of said outer wall for providing access to said upper passage such that one or more wires extend from said upper passage through said first set of apertures; and a second set of apertures formed as part of said outer wall for providing access to said lower passage such that one or more wires extend from said upper passage through said second set of apertures.

4. The integrated wireway for a conveyor system of claim 1, wherein said outer wall is connected to said upper wall and said lower wall through one selected from the group consisting of a bolt, a screw, a weld, and combinations thereof.

5. The integrated wireway for a conveyor system of claim 1, wherein said outer wall is made from one selected from the group consisting of steel, aluminum, and plastic.

6. The integrated wireway for a conveyor system of claim 1, wherein various devices of said conveyor system are supported by said outer cover on said upper wall lip portion, said various devices being one selected from the group consisting f an electric motor, a controller, a circuit box, and a monitoring system.

* * * * *